United States Patent
Simon et al.

(10) Patent No.: US 9,845,129 B2
(45) Date of Patent: Dec. 19, 2017

(54) STABILIZING ARRANGEMENT FOR A TILTING RUNNING GEAR OF A VEHICLE AND TILTING RUNNING GEAR

(71) Applicant: FORD GLOBAL TECHNOLOGIES, LLC, Dearborn, MI (US)

(72) Inventors: Marc Simon, Köln (DE); Advait Valluri, Aachen (DE); Robert Spahl, Cologne (DE); Thomas Gerhards, Niederzier (DE); Martin Saeger, Pulheim (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/839,137

(22) Filed: Aug. 28, 2015

(65) Prior Publication Data

US 2016/0059923 A1 Mar. 3, 2016

(30) Foreign Application Priority Data

Aug. 29, 2014 (DE) .................. 10 2014 217 246

(51) Int. Cl.
*B62K 5/10* (2013.01)
*B61F 5/00* (2006.01)
(Continued)

(52) U.S. Cl.
CPC .............. *B62K 5/10* (2013.01); *B60G 21/055* (2013.01); *B61F 5/00* (2013.01); *B62K 5/027* (2013.01);
(Continued)

(58) Field of Classification Search
CPC ........ B62K 5/10; B62K 5/027; B60G 21/055; B60G 2300/45; B60G 2202/135; B60G 2300/10; B61F 5/00
See application file for complete search history.

(56) References Cited

U.S. PATENT DOCUMENTS

| 2,186,065 A | 1/1940 | Fischer |
| 2,353,503 A | 7/1944 | Rost et al. |

(Continued)

FOREIGN PATENT DOCUMENTS

| CN | 1918013 A | 2/2007 |
| DE | 679966 C | 8/1939 |

(Continued)

OTHER PUBLICATIONS

United Kingdom Search Report for related Application No. GB1520837.4, dated Apr. 13, 2016.
(Continued)

*Primary Examiner* — Darlene P Condra
(74) *Attorney, Agent, or Firm* — Jones Robb, PLLC; Raymond L. Coppiellie

(57) ABSTRACT

A stabilizing arrangement for a tilting running gear of a non-rail-borne vehicle is disclosed. The stabilizing arrangement includes a balance beam configured to have each end coupled to a respective suspension side of a multi-track running gear axle of the tilting running gear. A pivot bearing is connected to a frame or body of the vehicle and defines a stationary axis of rotation. The pivot bearing rotatably supports the balance beam about the stationary axis of rotation. At least one stabilizing element is connected to the balance beam and is supported with respect to a frame or body of the vehicle. The at least one stabilizing element is configured to provide a reaction force to counteract a tilting moment of the vehicle. A non-rail-borne vehicle comprising the stabilizing arrangement also is disclosed.

14 Claims, 8 Drawing Sheets

(51) Int. Cl.
    *B60G 21/055*    (2006.01)
    *B62K 5/027*     (2013.01)
(52) U.S. Cl.
    CPC .... *B60G 2202/135* (2013.01); *B60G 2300/10* (2013.01); *B60G 2300/45* (2013.01)

(56) References Cited

U.S. PATENT DOCUMENTS

| | | | |
|---|---|---|---|
| 2,474,471 A | 6/1949 | Dolan | |
| 3,309,097 A * | 3/1967 | Seeber | B62D 49/08 180/41 |
| 3,417,985 A | 12/1968 | Hannan | |
| 3,558,123 A | 1/1971 | Yew | |
| 3,572,456 A | 3/1971 | Healy | |
| 3,589,700 A | 6/1971 | Ruet | |
| 3,733,087 A | 5/1973 | Allison | |
| 3,990,725 A | 11/1976 | Allison | |
| 3,992,036 A | 11/1976 | Allison | |
| 4,273,357 A | 6/1981 | Pashkow | |
| 4,351,410 A * | 9/1982 | Townsend | B62D 9/02 180/210 |
| 4,375,293 A | 3/1983 | Solbes | |
| 4,458,918 A | 7/1984 | Rumpel | |
| 4,614,359 A | 9/1986 | Lundin | |
| 4,632,413 A | 12/1986 | Fujita et al. | |
| 4,657,271 A | 4/1987 | Salmon | |
| 4,659,106 A * | 4/1987 | Fujita | B60G 21/007 280/124.103 |
| 4,685,690 A | 8/1987 | Fujita et al. | |
| 4,779,893 A | 10/1988 | Juechter | |
| 4,887,829 A * | 12/1989 | Prince | B60G 21/05 180/215 |
| 5,040,812 A | 8/1991 | Patin | |
| 5,040,823 A | 8/1991 | Lund | |
| 5,069,476 A | 12/1991 | Tsutsumi et al. | |
| 5,116,069 A | 5/1992 | Miller | |
| 5,161,425 A | 11/1992 | Baskett et al. | |
| 5,161,822 A | 11/1992 | Lund | |
| 5,207,451 A | 5/1993 | Furuse et al. | |
| 5,324,056 A | 6/1994 | Orton | |
| 5,337,847 A | 8/1994 | Woods et al. | |
| 5,347,457 A | 9/1994 | Tanaka et al. | |
| 5,445,443 A | 8/1995 | Hauser et al. | |
| 5,580,089 A | 12/1996 | Kolka | |
| 5,611,555 A | 3/1997 | Vidal | |
| 5,762,351 A | 6/1998 | SooHoo | |
| 5,765,115 A | 6/1998 | Ivan | |
| 5,765,846 A | 6/1998 | Braun | |
| 5,772,224 A | 6/1998 | Tong | |
| 5,791,425 A | 8/1998 | Kamen et al. | |
| 5,825,284 A | 10/1998 | Dunwoody et al. | |
| 5,839,082 A | 11/1998 | Iwasaki | |
| 5,927,424 A | 7/1999 | Van Den Brink et al. | |
| 6,026,920 A | 2/2000 | Obeda et al. | |
| 6,116,618 A | 9/2000 | Shono et al. | |
| 6,142,494 A | 11/2000 | Higuchi | |
| 6,149,226 A | 11/2000 | Hoelzel | |
| 6,213,561 B1 | 4/2001 | Witthaus | |
| 6,250,649 B1 | 6/2001 | Braun | |
| 6,311,795 B1 | 11/2001 | Skotnikov | |
| 6,328,125 B1 | 12/2001 | Van Den Brink et al. | |
| 6,367,824 B1 | 4/2002 | Hayashi | |
| 6,390,505 B1 | 5/2002 | Wilson | |
| 6,425,585 B1 | 7/2002 | Schuelke et al. | |
| 6,435,522 B1 | 8/2002 | Van Den Brink et al. | |
| 6,446,980 B1 | 9/2002 | Kutscher et al. | |
| 6,454,035 B1 | 9/2002 | Waskow et al. | |
| 6,460,835 B1 | 10/2002 | Hamano et al. | |
| 6,467,783 B1 | 10/2002 | Blondelet et al. | |
| 6,511,078 B2 | 1/2003 | Sebe | |
| 6,554,293 B1 | 4/2003 | Fennel et al. | |
| 6,564,129 B2 | 5/2003 | Badenoch | |
| 6,637,758 B2 | 10/2003 | Woo | |
| 6,654,674 B2 | 11/2003 | Lu et al. | |
| 6,697,726 B2 | 2/2004 | Takagi et al. | |
| 6,702,265 B1 | 3/2004 | Zapletal | |
| 6,722,676 B2 | 4/2004 | Zadok | |
| 6,725,135 B2 | 4/2004 | McKeown et al. | |
| 6,805,362 B1 | 10/2004 | Melcher | |
| 6,817,617 B2 | 11/2004 | Hayashi | |
| 7,066,474 B2 | 6/2006 | Hiebert et al. | |
| 7,073,806 B2 | 7/2006 | Bagnoli | |
| 7,097,187 B2 | 8/2006 | Walters et al. | |
| 7,131,650 B2 | 11/2006 | Melcher | |
| 7,229,086 B1 | 6/2007 | Rogers | |
| 7,343,997 B1 | 3/2008 | Matthies | |
| 7,389,592 B2 | 6/2008 | Tsuruta et al. | |
| 7,487,985 B1 | 2/2009 | Mighell | |
| 7,568,541 B2 | 8/2009 | Pfeil et al. | |
| 7,571,787 B2 | 8/2009 | Saiki | |
| 7,591,337 B2 | 9/2009 | Suhre et al. | |
| 7,607,695 B2 | 10/2009 | Moulene | |
| 7,631,721 B2 | 12/2009 | Hobbs | |
| 7,640,086 B2 | 12/2009 | Nakashima et al. | |
| 7,641,207 B2 | 1/2010 | Yang | |
| 7,648,148 B1 | 1/2010 | Mercier | |
| 7,665,742 B2 | 2/2010 | Haerr et al. | |
| 7,673,883 B2 | 3/2010 | Damm | |
| 7,731,210 B2 | 6/2010 | Pedersen | |
| 7,887,070 B2 | 2/2011 | Kirchner | |
| 7,896,360 B2 | 3/2011 | Buma | |
| 7,914,020 B2 | 3/2011 | Boston | |
| 7,946,596 B2 | 5/2011 | Hsu et al. | |
| 7,967,306 B2 | 6/2011 | Mighell | |
| 8,016,302 B1 * | 9/2011 | Reeve | B62K 5/05 280/124.103 |
| 8,050,820 B2 | 11/2011 | Yanaka et al. | |
| 8,070,172 B1 * | 12/2011 | Smith | B60G 11/08 280/124.103 |
| 8,104,781 B2 | 1/2012 | Gazarek | |
| 8,260,504 B2 | 9/2012 | Tsujii et al. | |
| 8,262,111 B2 | 9/2012 | Lucas | |
| 8,345,096 B2 | 1/2013 | Ishiyama et al. | |
| 8,641,064 B2 | 2/2014 | Krajekian | |
| 8,651,503 B2 | 2/2014 | Rhodig | |
| 8,818,700 B2 | 8/2014 | Moulene et al. | |
| 8,925,940 B2 * | 1/2015 | Mighell | B62K 5/027 180/210 |
| 9,045,015 B2 | 6/2015 | Spahl et al. | |
| 9,090,281 B2 | 7/2015 | Spahl et al. | |
| 9,145,168 B2 | 9/2015 | Spahl et al. | |
| 9,216,763 B2 | 12/2015 | Huntzinger | |
| 9,248,857 B2 | 2/2016 | Spahl et al. | |
| 9,283,989 B2 | 3/2016 | Spahl et al. | |
| 9,296,420 B2 * | 3/2016 | Sasaki | B62J 15/00 |
| 9,493,208 B2 * | 11/2016 | Sasaki | B62K 5/08 |
| 2001/0028154 A1 | 10/2001 | Sebe | |
| 2002/0109310 A1 | 8/2002 | Lim et al. | |
| 2002/0171216 A1 | 11/2002 | Deal | |
| 2002/0190494 A1 | 12/2002 | Cocco | |
| 2003/0071430 A1 | 4/2003 | Serra et al. | |
| 2003/0102176 A1 | 6/2003 | Bautista | |
| 2003/0141689 A1 | 7/2003 | Hamy | |
| 2003/0197337 A1 | 10/2003 | Dodd et al. | |
| 2004/0051262 A1 | 3/2004 | Young | |
| 2004/0100059 A1 | 5/2004 | Van Den Brink | |
| 2004/0134302 A1 | 7/2004 | Ko et al. | |
| 2004/0199314 A1 | 10/2004 | Meyers et al. | |
| 2004/0236486 A1 | 11/2004 | Krause et al. | |
| 2005/0051976 A1 | 3/2005 | Blondelet et al. | |
| 2005/0082771 A1 | 4/2005 | Oh | |
| 2005/0127656 A1 | 6/2005 | Sato et al. | |
| 2005/0184476 A1 | 8/2005 | Hamm | |
| 2005/0199087 A1 | 9/2005 | Li et al. | |
| 2005/0206101 A1 | 9/2005 | Bouton | |
| 2005/0275181 A1 | 12/2005 | Macisaac | |
| 2006/0049599 A1 | 3/2006 | Lehane | |
| 2006/0091636 A1 | 5/2006 | Shelton | |
| 2006/0151982 A1 | 7/2006 | Mills | |
| 2006/0170171 A1 | 8/2006 | Pedersen | |
| 2006/0180372 A1 | 8/2006 | Mercier et al. | |
| 2006/0220331 A1 | 10/2006 | Schafer et al. | |
| 2006/0226611 A1 | 10/2006 | Xiao et al. | |

(56) References Cited

U.S. PATENT DOCUMENTS

| | | |
|---|---|---|
| 2006/0249919 A1 | 11/2006 | Suzuki et al. |
| 2006/0276944 A1 | 12/2006 | Yasui et al. |
| 2007/0029751 A1 | 2/2007 | Marcacci |
| 2007/0075517 A1 | 4/2007 | Suhre et al. |
| 2007/0078581 A1 | 4/2007 | Nenninger et al. |
| 2007/0126199 A1 | 6/2007 | Peng et al. |
| 2007/0151780 A1 | 7/2007 | Tonoli et al. |
| 2007/0182110 A1 | 8/2007 | Urababa |
| 2007/0182120 A1 | 8/2007 | Tonoli et al. |
| 2007/0193803 A1 | 8/2007 | Geiser |
| 2007/0193815 A1 | 8/2007 | Hobbs |
| 2007/0228675 A1 | 10/2007 | Tonoli et al. |
| 2007/0241522 A1 | 10/2007 | Tsai |
| 2008/0001377 A1 | 1/2008 | Rogic |
| 2008/0012262 A1 | 1/2008 | Carabelli et al. |
| 2008/0033612 A1 | 2/2008 | Raab |
| 2008/0100018 A1 | 5/2008 | Dieziger |
| 2008/0114509 A1 | 5/2008 | Inoue et al. |
| 2008/0115994 A1 | 5/2008 | Martini |
| 2008/0135320 A1 | 6/2008 | Matthies |
| 2008/0164085 A1 | 7/2008 | Cecinini |
| 2008/0197597 A1 | 8/2008 | Moulene et al. |
| 2008/0197599 A1 | 8/2008 | Comstock et al. |
| 2008/0223634 A1 | 9/2008 | Yamamoto et al. |
| 2008/0227365 A1 | 9/2008 | Lo |
| 2008/0238005 A1 | 10/2008 | James |
| 2008/0255726 A1 | 10/2008 | Fischlein et al. |
| 2008/0258416 A1 | 10/2008 | Wilcox |
| 2008/0272562 A1 | 11/2008 | Sabelstrom et al. |
| 2009/0026719 A1 | 1/2009 | Koch et al. |
| 2009/0085311 A1 | 4/2009 | Kim et al. |
| 2009/0105906 A1 | 4/2009 | Hackney et al. |
| 2009/0108555 A1 | 4/2009 | Wilcox |
| 2009/0171530 A1 | 7/2009 | Bousfield |
| 2009/0194961 A1 | 8/2009 | Dieziger |
| 2009/0194965 A1 | 8/2009 | Boston |
| 2009/0197731 A1 | 8/2009 | Kobler |
| 2009/0289437 A1 | 11/2009 | Steinhilber |
| 2009/0299565 A1 | 12/2009 | Hara et al. |
| 2009/0312908 A1 | 12/2009 | Van Den Brink |
| 2009/0314566 A1 | 12/2009 | Rust |
| 2009/0315282 A1* | 12/2009 | Kirchner ............. B62K 5/027 280/5.521 |
| 2010/0025944 A1 | 2/2010 | Hara et al. |
| 2010/0030441 A1 | 2/2010 | Kosaka |
| 2010/0032914 A1 | 2/2010 | Hara et al. |
| 2010/0032915 A1 | 2/2010 | Hsu et al. |
| 2010/0044977 A1 | 2/2010 | Hughes et al. |
| 2010/0044979 A1 | 2/2010 | Haeusler et al. |
| 2010/0152987 A1 | 6/2010 | Gorai |
| 2010/0219600 A1 | 9/2010 | Dada |
| 2011/0006498 A1 | 1/2011 | Mercier |
| 2011/0095494 A1 | 4/2011 | White |
| 2011/0148052 A1 | 6/2011 | Quemere |
| 2011/0215544 A1 | 9/2011 | Rhodig |
| 2011/0254238 A1 | 10/2011 | Kanou |
| 2012/0098225 A1 | 4/2012 | Lucas |
| 2012/0248717 A1 | 10/2012 | Tsujii et al. |
| 2013/0062133 A1 | 3/2013 | Budweil |
| 2013/0068550 A1 | 3/2013 | Gale |
| 2013/0127131 A1 | 5/2013 | Michel |
| 2013/0153311 A1 | 6/2013 | Huntzinger |
| 2013/0168934 A1 | 7/2013 | Krajekian |
| 2014/0252730 A1 | 9/2014 | Spahl et al. |
| 2014/0252731 A1 | 9/2014 | Spahl et al. |
| 2014/0252732 A1 | 9/2014 | Spahl et al. |
| 2014/0252733 A1 | 9/2014 | Spahl et al. |
| 2014/0252734 A1 | 9/2014 | Spahl et al. |
| 2014/0312580 A1 | 10/2014 | Gale |
| 2014/0346753 A1 | 11/2014 | Huang et al. |
| 2014/0353937 A1 | 12/2014 | Girelli Consolaro |
| 2014/0365078 A1 | 12/2014 | Gerecke et al. |
| 2015/0045171 A1 | 2/2015 | Schimpf et al. |
| 2015/0094909 A1 | 4/2015 | Illg |
| 2016/0009180 A1 | 1/2016 | Barrass |
| 2016/0059661 A1 | 3/2016 | Saeger et al. |
| 2016/0144680 A1 | 5/2016 | Simon et al. |
| 2016/0243918 A1 | 8/2016 | Spahl et al. |
| 2016/0244094 A1 | 8/2016 | Spahl et al. |

FOREIGN PATENT DOCUMENTS

| | | |
|---|---|---|
| DE | 1937578 U | 1/1963 |
| DE | 6801096 U | 11/1967 |
| DE | 4035128 A1 | 6/1992 |
| DE | 4135585 A1 | 5/1993 |
| DE | 4236328 C1 | 9/1993 |
| DE | 4315017 C1 | 9/1994 |
| DE | 19621947 C1 | 10/1997 |
| DE | 19735912 A1 | 3/1998 |
| DE | 19717418 C1 | 10/1998 |
| DE | 19800292 A1 | 6/1999 |
| DE | 19848294 A1 | 10/1999 |
| DE | 19838328 C1 | 12/1999 |
| DE | 19846275 A1 | 12/1999 |
| DE | 19831162 A1 | 7/2000 |
| DE | 10251946 B3 | 3/2004 |
| DE | 10349655 A1 | 6/2005 |
| DE | 102004027202 A1 | 10/2005 |
| DE | 102004058523 A1 | 6/2006 |
| DE | 102007006546 A1 | 8/2007 |
| DE | 112006002581 T5 | 9/2008 |
| DE | 102007024769 A1 | 11/2008 |
| DE | 102008046588 A1 | 3/2010 |
| DE | 102009042662 A1 | 3/2011 |
| DE | 102010000884 A1 | 7/2011 |
| DE | 102010000886 A1 | 7/2011 |
| DE | 102010055947 A1 | 8/2011 |
| DE | 102010041404 A1 | 3/2012 |
| DE | 102010046317 A1 | 3/2012 |
| DE | 102012217416 A1 | 3/2014 |
| EP | 0592377 A1 | 4/1994 |
| EP | 0606191 A1 | 7/1994 |
| EP | 0626307 A1 | 11/1994 |
| EP | 0658453 A2 | 6/1995 |
| EP | 1030790 A1 | 8/2000 |
| EP | 1142779 A2 | 10/2001 |
| EP | 1153773 A2 | 11/2001 |
| EP | 1155950 A2 | 11/2001 |
| EP | 1180476 A1 | 2/2002 |
| EP | 1228905 A2 | 8/2002 |
| EP | 1346907 A2 | 9/2003 |
| EP | 1348617 A1 | 10/2003 |
| EP | 1419909 A2 | 5/2004 |
| EP | 1539563 A1 | 6/2005 |
| EP | 1600313 A1 | 11/2005 |
| EP | 1630081 A1 | 3/2006 |
| EP | 1702773 A2 | 9/2006 |
| EP | 1798081 A1 | 6/2007 |
| EP | 1872981 A1 | 1/2008 |
| EP | 1773609 B1 | 3/2008 |
| EP | 1944228 A1 | 7/2008 |
| EP | 2030814 A2 | 3/2009 |
| EP | 2077223 A1 | 7/2009 |
| EP | 2199122 A1 | 6/2010 |
| EP | 2213561 A1 | 8/2010 |
| EP | 2475570 B1 | 7/2012 |
| EP | 2712796 A2 | 4/2014 |
| ES | 2284383 A1 | 1/2007 |
| FR | 2663283 A1 | 12/1991 |
| FR | 2768203 A1 | 3/1999 |
| FR | 2858963 A1 | 2/2005 |
| FR | 2872699 A1 | 1/2006 |
| FR | 2927026 A1 | 8/2009 |
| FR | 2937000 A1 | 4/2010 |
| FR | 2946944 A1 | 12/2010 |
| FR | 2961746 A1 | 12/2011 |
| GB | 480191 A | 2/1938 |
| GB | 1157016 A | 7/1969 |
| GB | 2322837 A | 9/1998 |
| GB | 2382334 A | 11/2001 |
| GB | 2374327 A | 10/2002 |
| GB | 2390065 A | 12/2003 |
| GB | 2394701 A | 5/2004 |

(56) References Cited

FOREIGN PATENT DOCUMENTS

| | | |
|---|---|---|
| GB | 2444250 A | 6/2008 |
| GB | 2450740 A | 1/2009 |
| GB | 2472180 A | 2/2011 |
| GB | 2476877 A | 7/2011 |
| GB | 2492757 A | 1/2013 |
| JP | 4-69710 A | 3/1992 |
| JP | 4-71918 A | 3/1992 |
| JP | 4-108018 A | 4/1992 |
| JP | 2001-206036 A | 7/2001 |
| JP | 2003-81165 A | 3/2003 |
| JP | 2004-306850 A | 11/2004 |
| JP | 2005-193890 A | 7/2005 |
| JP | 2006-7865 A | 1/2006 |
| JP | 2006-44467 A | 2/2006 |
| JP | 2006-168503 A | 6/2006 |
| JP | 2006-232197 A | 9/2006 |
| JP | 2006248489 A | 9/2006 |
| JP | 2006-281918 A | 10/2006 |
| JP | 2006-341718 A | 12/2006 |
| JP | 2007-10511 A | 1/2007 |
| JP | 2007-69688 A | 3/2007 |
| JP | 2007-106332 A | 4/2007 |
| JP | 2007-161013 A | 6/2007 |
| JP | 2007-186179 A | 7/2007 |
| JP | 2007-210456 A | 8/2007 |
| JP | 2007-238056 A | 9/2007 |
| JP | 2008-1236 A | 1/2008 |
| JP | 2008-62854 A | 3/2008 |
| JP | 2008-120360 A | 5/2008 |
| JP | 2008-132933 A | 6/2008 |
| JP | 2009-270918 A | 11/2009 |
| JP | 2010-155486 A | 7/2010 |
| JP | 2010-168000 A | 8/2010 |
| JP | 2011230727 A | 11/2011 |
| JP | 2012153349 A | 8/2012 |
| WO | 94/06642 A1 | 3/1994 |
| WO | 96/27508 A1 | 9/1996 |
| WO | 97/09223 A1 | 3/1997 |
| WO | 97/27071 A1 | 7/1997 |
| WO | 99/41136 A1 | 8/1999 |
| WO | 99/47372 A1 | 9/1999 |
| WO | 99/54186 A1 | 10/1999 |
| WO | 02/24477 A1 | 3/2002 |
| WO | 02/068228 A1 | 9/2002 |
| WO | 03/021190 A1 | 3/2003 |
| WO | 03/057549 A1 | 7/2003 |
| WO | 2004/011319 A1 | 2/2004 |
| WO | 2004/041621 A1 | 5/2004 |
| WO | 2005/039955 A2 | 5/2005 |
| WO | 2005/058620 A1 | 6/2005 |
| WO | 2006/006859 A2 | 1/2006 |
| WO | 2006/129020 A1 | 12/2006 |
| WO | 2008/043870 A1 | 4/2008 |
| WO | 2008/044838 A1 | 4/2008 |
| WO | 2008/053827 A1 | 5/2008 |
| WO | 2008/065436 A1 | 6/2008 |
| WO | 2009/059099 A2 | 5/2009 |
| WO | 2009/074752 A2 | 6/2009 |
| WO | 2009/087595 A1 | 7/2009 |
| WO | 2009/106978 A1 | 9/2009 |
| WO | 2010/009928 A1 | 1/2010 |
| WO | 2010/015986 A1 | 2/2010 |
| WO | 2010/015987 A1 | 2/2010 |
| WO | 2010/035877 A1 | 4/2010 |
| WO | 2010/106385 A1 | 9/2010 |
| WO | 2010/116641 A1 | 10/2010 |
| WO | 2011005945 A1 | 1/2011 |
| WO | 2011/023862 A1 | 3/2011 |
| WO | 2011029795 A1 | 3/2011 |
| WO | 2011/053228 A1 | 5/2011 |
| WO | 2011/059456 A1 | 5/2011 |
| WO | 2011/074204 A1 | 6/2011 |
| WO | 2011/083335 A2 | 7/2011 |
| WO | 2011102108 A1 | 8/2011 |
| WO | 2011/107674 A1 | 9/2011 |
| WO | 2012031150 A2 | 3/2012 |
| WO | 2014009637 A1 | 1/2014 |

OTHER PUBLICATIONS

Office Action from co-pending U.S. Appl. No. 14/554,410.
Further United Kingdom Search Report for related Application No. GB1520837.4, dated May 4, 2016.
Non-Final Office Action dated Jun. 27, 2016 from co-pending U.S. Appl. No. 14/630,070.
Non-Final Office Action dated Jun. 27, 2016 from co-pending U.S. Appl. No. 14/630,106.
Non-Final Office Action dated Aug. 3, 2016 from co-pending U.S. Appl. No. 14/554,410.
Office Action dated Nov. 28, 2014 for U.S. Appl. No. 14/201,550.
Office Action dated Oct. 10, 2014 for U.S. Appl. No. 14/201,602.
Office Action dated Sep. 4, 2014 for co-pending U.S. Appl. No. 14/201,628.
Office Action dated Dec. 26, 2014 for co-pending U.S. Appl. No. 14/201,628.
Office Action dated Mar. 11, 2015 for co-pending U.S. Appl. No. 14/201,628.
Office Action dated Jan. 29, 2015 for U.S. Appl. No. 14/201,616.
Office Action dated Dec. 19, 2014 for U.S. Appl. No. 14/201,586.
Office Action dated Jun. 1, 2015 for U.S. Appl. No. 14/201,586.
Office Action dated Jul. 28, 2015 for co-pending U.S. Appl. No. 14/201,628.
Notice of Allowance dated Mar. 19, 2015 for U.S. Appl. No. 14/201,550.
Notice of Allowance dated Sep. 28, 2015 for U.S. Appl. No. 14/201,586.
Notice of Allowance dated Feb. 3, 2015 for U.S. Appl. No. 14/201,602.
Notice of Allowance dated May 20, 2015 for U.S. Appl. No. 14/201,616.
Advisory Action dated Oct. 7, 2015 for co-pending U.S. Appl. No. 14/201,628.
Notice of Allowance dated Nov. 3, 2015 for co-pending U.S. Appl. No. 14/201,628.
Office Action dated Nov. 6, 2015 for co-pending U.S. Appl. No. 14/554,410.
Machine translation of German Examination Report dated May 28, 2015 for German Application No. 102014217386.8.
Machine translation of German Examination Report dated Apr. 30, 2015 for German Application No. 102014217246.2.
Chinese Notification of First Office Action for related Application No. CN201410083008.9, dated Apr. 6, 2017.
Non-Final Office Action dated Apr. 27, 2017 from co-pending U.S. Appl. No. 14/630,070.
Non-Final Office Action dated May 5, 2017 from co-pending U.S. Appl. No. 14/630,106.
Chinese Notification of First Office Action for related Application No. CN201410081761.4, dated Mar. 29, 2017.
Chinese Notification of First Office Action for related Application No. CN201410082053.2, dated Apr. 27, 2017.
Chinese Notification of First Office Action for related Application No. CN201410083843.2, dated Mar. 24, 2017.
Chinese Notification of First Office Action for related Application No. CN201410083467.7, dated Mar. 24, 2017.
Advisory Action dated Mar. 29, 2017 from co-pending U.S. Appl. No. 14/630,070.
Advisory Action dated Mar. 27, 2017 from co-pending U.S. Appl. No. 14/630,106.
Notice of Allowance dated Jan. 27, 2017 from co-pending U.S. Appl. No. 14/554,410.
Final Office Action dated Dec. 30, 2016 from co-pending U.S. Appl. No. 14/630,070.
Final Office Action dated Dec. 30, 2016 from co-pending U.S. Appl. No. 14/630,106.
Non-Final Office Action dated Jan. 5, 2017 from co-pending U.S. Appl. No. 14/842,099.

(56) References Cited

OTHER PUBLICATIONS

German Search Report for related Application No. 10 2013 203 923.9 dated Oct. 8, 2013.
German Search Report for related Application No. 10 2013 203 922.0 dated Oct. 14, 2013.
German Search Report for related Application No. 10 2013 203 927.1 dated Nov. 5, 2013.
German Search Report for related Application No. 10 2013 203 926.3 dated Oct. 31, 2013.
German Search Report for related Application No. 10 2013 203 924.7 dated Oct. 24, 2013.

* cited by examiner

STABILIZING ARRANGEMENT FOR A TILTING RUNNING GEAR OF A VEHICLE AND TILTING RUNNING GEAR

CROSS REFERENCE TO RELATED APPLICATIONS

This application claims priority to German Application No. 10 2014 217 246.2, filed on Aug. 29, 2014, the entire content of which is incorporated by reference herein.

TECHNICAL FIELD

The present disclosure relates generally to a stabilizing arrangement for a tilting running gear of a non-rail-borne vehicle, in particular of a motor vehicle.

BACKGROUND

Single track vehicles—such as a motorcycle—comprise the characteristic that when negotiating curves they require an appropriate transverse tilt in the respective steering direction. A corresponding force is generated by means of the so-called "angle of tilt" of the vehicle in the direction of the curve center point and the force counteracts the centrifugal force that acts on the vehicle and that increases as the velocity increases. Without tilting in this manner, the vehicle would, so to speak, tip over when negotiating a curve.

A similar stability problem arises in the case of multi-track vehicles, in particular two-track vehicles on at least one axle, which have a small track width. In this case, the opposing moment that arises from the vehicle weight and track width is no longer sufficient above an individual curve velocity. As a result, the wheel of the axle that is on the inside of the curve can lose its contact with the ground during a steering maneuver. In this state, when the velocity is above a specific value, the vehicle is in danger of tilting over opposite to the curve direction and, consequently, tipping out of the curve.

Therefore, in addition to lowering the center of gravity of the vehicle, vehicles of this type have been equipped with tilting technology, as a result of which the bodies of the vehicles can be tilted into the curves in a similar manner to the body of a motorcycle. The stabilizing process that is possible in this manner is similar to that which can be performed by single-track vehicles—for example, by means of the person steering the vehicle and/or by way of a suitable auxiliary means. It has been established in the case of tilting vehicles of this type that comprise at least one multi-track vehicle axle, that when the tilting vehicles are in their upright position they are generally in an unstable state of equilibrium.

In this case, it is the body that tilts and, accordingly, tips sideward with respect to the running gear without corresponding measures. In so doing, even the smallest stimulus is sufficient in order to tip the body of vehicles of this type out of its upright position or even to cause the entire vehicle to tip over. The magnitude of tilting moment that is to be counteracted increases due to the increasing length of the moment arm of the center of gravity as the tilt of the body increases.

It is possible to differentiate between a fully passive or active and occasionally semi-active tilting technology. The fully passive tilting vehicles represent the simplest implementation of this technology. In the case of the technology, the vehicle body is tilted in order to initiate the negotiation of curves and in order to stabilize the vehicle body, as in the case of a motorcycle, only by means of a steering movement in combination with a corresponding weight shift of the person steering the vehicle. Systems of this type are not easy to drive for this reason. The greater weight of a multi-track vehicle means that tilting running gears that are constructed in such a simple manner do not function or at least do not function in a satisfactory manner.

Fully active tilting mechanisms offer maximum support, since the angle of tilt of the vehicle is monitored at each point in time and is automatically corrected as required. This embodiment requires a suitable actuator that actively implements the correcting procedures and in this manner transmits them to the wheel suspension. It is necessary for this purpose that the actuator is permanently providing a force and the actuator must be sufficiently powerful for this purpose. In addition to the associated increase in weight, the high costs for a tilting technology of this type are also to be mentioned. As a result, vehicles that are equipped in this manner also provide less pleasure when driving the vehicle, which is a result of the unnatural driving sensation. Additional factors are the occasionally quite costly body and the high costs that arise for actuators that are to be embodied in a correspondingly robust manner and are accordingly heavy. Last but not least, bodies of this type require an appropriate amount of installation space since their dimensions could otherwise not be accommodated.

It is apparent from this that tilting running gears require suitable stabilizing means in order to be able to move vehicles of this type safely and comfortably and with a pleasant driving sensation. In view of the illustrated disadvantages of fully passive and active tilting systems, the technology required for this purpose still continues to offer room for improvements.

In particular, there is yet to be a stabilizing arrangement and a tilting running gear for a non-rail-borne vehicle that renders possible a cost-effective body and an easier handling of the vehicle so equipped.

SUMMARY

In accordance with various exemplary embodiments, the present disclosure provides a stabilizing arrangement for a tilting running gear of a non-rail-borne vehicle. The stabilizing arrangement comprises a balance beam configured to have each end coupled to a respective suspension side of a multi-track running gear axle of the tilting running gear. A pivot bearing is connected to a frame or body of the vehicle and defines a stationary axis of rotation. The pivot bearing rotatably supports the balance beam about the stationary axis of rotation. At least one stabilizing element is connected to the balance beam and is supported with respect to a frame or body of the vehicle. The at least one stabilizing element is configured to provide a reaction force to counteract a tilting moment of the vehicle.

In accordance with various exemplary embodiments, the present disclosure also provides a non-rail-borne vehicle. The vehicle comprises at least three wheels and a tilting running gear including at least one multi-track running gear axle having two opposed suspension sides. A balance beam has each end coupled to a respective suspension side of the multi-track running gear axle. A pivot bearing is connected to a frame or body of the vehicle. The pivot bearing rotatably supports the balance beam such that the balance beam is rotatable about a stationary axis of rotation of the pivot bearing. At least one stabilizing element is connected to the balance beam and is supported with respect to a frame or body of the vehicle. The at least one stabilizing element is configured to provide a reaction force to counteract a tilting moment of the vehicle.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Like parts in the different figures are always provided with the same reference numerals, so that the parts are also generally described only once.

Figure 1:
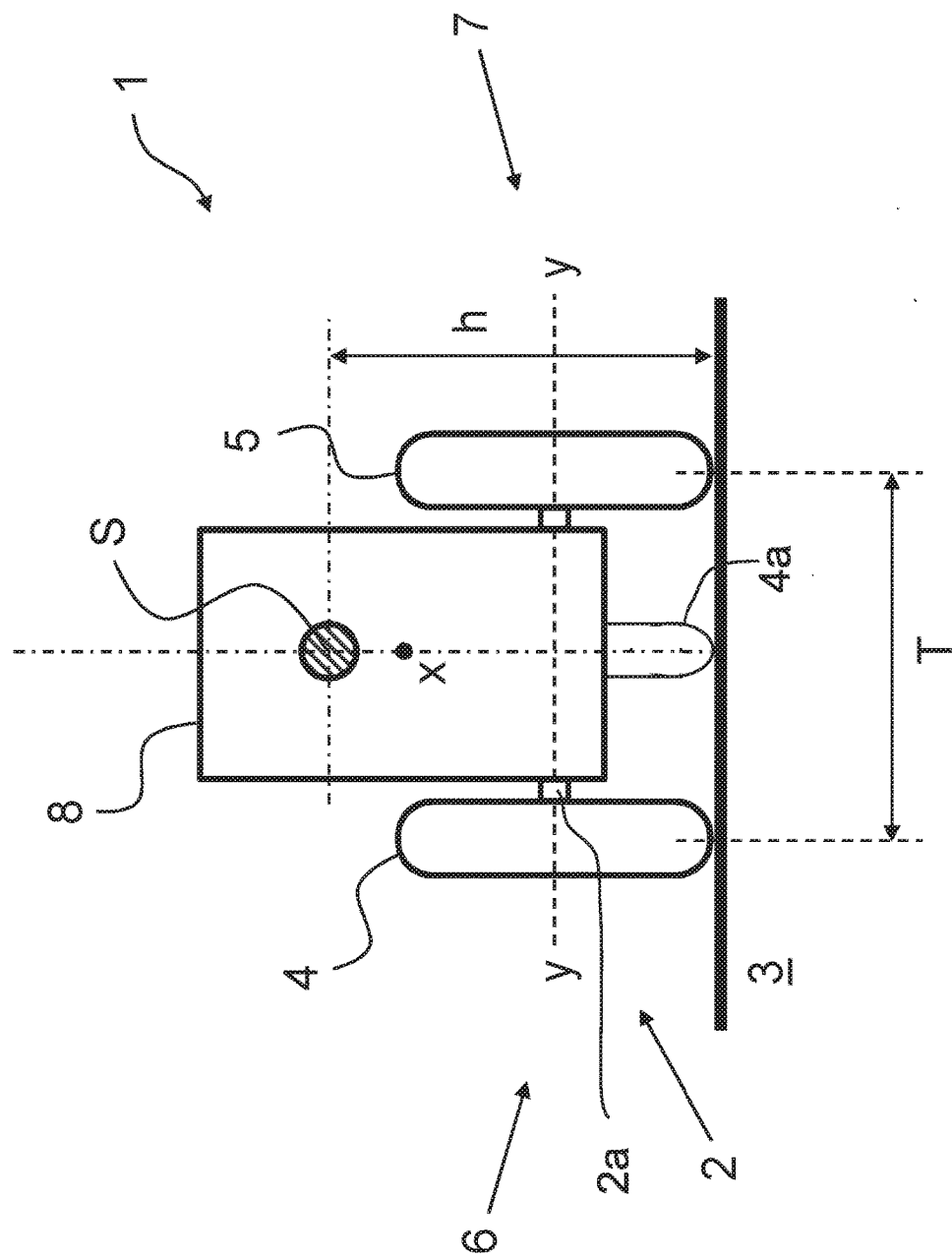
FIG. 1 is a front view of a typical body of a tilting vehicle having a passive tilting running gear in the upright position.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

In accordance with the present teachings, a stabilizing arrangement for a tilting running gear is provided. The tilting running gear has at least one multi-track running gear axle that is suitable for a non-rail-borne vehicle. The stabilizing arrangement as disclosed herein comprises a balance beam that can be coupled to a respective suspension side of the running gear axle. Furthermore, at least one passive stabilizing means is provided, the stabilizing means connected to the balance beam by way of its two ends. The stabilizing means is supported in the installed state with respect to a frame or a body of the vehicle. When connected, the stabilizing means extends between the balance beam and the frame or body of the vehicle. In this arrangement, the stabilizing means provides a required a force, in particular a reaction force.

With regard to the tilt of the body with respect to the remaining running gear, the body experiences a tilting moment that is composed essentially of the perpendicularly functioning center of gravity and the moment arm that increases in length as the vehicle tilt increases. The reaction force provided by the stabilizing means is directed such that it acts against the tilting moment that results from the tilt of the vehicle. The present description treats the procedure of the body tilting or tipping and the vehicle tilting or tipping as being the same.

In accordance with the present disclosure, a structural pivot bearing is provided between the two free ends of the balance beam. In other words, the balance beam is connected in the middle to the pivot bearing. Consequently, the balance beam can be connected by way of the pivot bearing to the frame or the body of the vehicle in such a manner that the balance beam can rotate about a stationary axis of rotation that is provided by means of the pivot bearing. The alignment of the pivot bearing and its axis of rotation with respect to the balance beam that extends between the suspension sides is arranged in such a manner that the axis of rotation extends in a longitudinal direction of the vehicle.

An alignment of the axis of rotation in the longitudinal direction of the vehicle includes a position of the axis of rotation that deviates from a parallel alignment with respect to the longitudinal direction insofar as this points almost in the direction of travel when the vehicle is travelling in a straight line. In other words, the axis of rotation is constantly aligned in a perpendicular manner with respect to the running gear axle, wherein the tilt direction of the axis of rotation can also deviate as required upwards or downwards with respect to the longitudinal direction of the vehicle.

The resultant advantage resides in the arrangement of the stationary pivot bearing that can be combined with a single stabilizing means. In particular, the fact that the stationary axis of rotation of the balance beam is structurally fixed renders it possible to achieve a precise alignment of the balance beam during its limited rotation. Also, the possible reduction to a single stabilizing means renders it possible to achieve an extremely cost-effective and, in addition, light structure of the stabilizing arrangement.

In accordance with one exemplary embodiment of the present disclosure, the stabilizing means is a torsion spring element. As an alternative thereto, the stabilizing means can also comprise more than one torsion spring element of this type. The torsion spring element can be in the region of the pivot bearing and support itself in the installed state with respect to the frame or the body of vehicle. Thus, the torsion spring element can be arranged, by way of example, about the structural axis of rotation that is provided by the pivot bearing, as a consequence of which the magnitude of force that is applied is ideal. The torsion spring element can comprise two torsion springs that can be tensioned in a different directions of rotation. As a consequence, a tilt of the vehicle or of its body in a sideward direction causes the tensioning of at least one torsion spring that supports the subsequent procedure of restoring the vehicle to its upright position. The torsion spring element can also comprise only a single torsion spring that, due to its design and the fact that it is connected, can be tensioned irrespective of the direction of the vehicle tilt.

The resultant advantage resides in an extremely compact embodiment that renders it possible, by way of example, to directly integrate or couple the torsion spring element in or to the pivot bearing.

The stabilizing means can also be pre-tensioned so that the stabilizing means also contributes to restoring the vehicle or its body to its upright position when vertically aligning the vehicle or its body. In accordance with one exemplary embodiment, the force provided by means of the stabilizing means can manifest itself as a reaction force only in response to a tilting moment that results from the tilt. In this manner, the stabilizing means supports only the procedure of restoring the vehicle or its body to its upright position out of a tilt. The activation of the stabilizing means that results from a pure reaction is defined in this case as a passive support.

In particular, this dispenses with a possible active control that influences the stabilizing means, for example, on the basis of previously detected data relating to the driving dynamics. In this case, the stabilizing means is to be understood in terms of a resistance that assists the person moving the vehicle merely in restoring the vehicle to its upright position from a tilt position. In this manner, in addition to a cost-effective structure of the stabilizing arrangement, in particular the handling of the vehicle that is equipped in this manner is considerably easier.

The stabilizing arrangement is suitable both for passive and also for active tilting technologies. In addition to the simplified handling procedure that has already been described for passive tilting running gears, the stabilizing arrangement in accordance with the present teachings supports, in the case of active tilting running gears, the downsizing of the at least one actuator that is required therein. The stabilizing means already provides support for the procedure of restoring the vehicle to its upright position, so the force that remains and is to be applied by means of the actuator is noticeably reduced. Due to the fact that the actuator is now smaller, the tilting running gear that is equipped in this manner can also be produced in an overall cost-effective manner. Furthermore, as a result of the actuator being smaller, its weight is also reduced, wherein the weight savings is considerable despite the additional stabilizing means.

In contrast to the exemplary embodiment of the torsion spring, it is also feasible that the stabilizing element can be a linear spring element or can at least comprise a linear spring element of this type. A combination of a linear spring element and a torsion spring element is also possible.

In an exemplary embodiment, the linear spring element may be mounted on a fastening region of the balance beam that is lying between the pivot bearing and a free end of the balance beam. The moment arm for the linear spring element is changes depending upon the spacing of the fastening region from the pivot bearing. As will be understood by those of ordinary skill in the art, the process of determining the precise position of the fastening region may be based, for example, on the basis of the anticipated tilting moment, the adjustable force of the linear spring element, and/or the length of the balance beam. In each case, the linear spring element is provided for the purpose of being supported, in the installed state, for example, at its end region that lies opposite the fastening region on the frame or the body of the vehicle.

In this manner, a simply constructed linear spring element can be used in order to provide a cost-effective and easy-to-maintain solution for the stabilizing arrangement. In one exemplary embodiment of the linear spring element, the magnitude of force that the linear spring can provide can be adjusted during continuous operation and/or by means of a manipulation in the stationary state.

According to another exemplary embodiment, the stabilizing means may be a leaf spring element or at least can comprise a leaf spring element. Additionally or alternatively, a combination of a leaf spring element and a linear spring element and/or a torsion spring element is also feasible. As already mentioned with respect to the possible embodiment of the stabilizing means as a linear spring element, the leaf spring element can also be mounted on a fastening region of the balance beam that is lying between the pivot bearing and a free end of the balance beam. The articulated connection to the balance beam can be performed by way of a first end section of the leaf spring element. The moment arm for the leaf spring element can thus also be changed accordingly, depending upon the spacing of the fastening region from the pivot bearing. In one exemplary embodiment, the fastening region can lie on a free end of the balance beam.

As already mentioned in connection with the possible embodiment as a linear spring element or with the presence of a linear spring element, the process of determining the precise position of the fastening element for the leaf spring element may be based, for example, on the basis of the anticipated tilting moment, the adjustable force of the leaf spring element and/or the position of the balance beam.

Furthermore, the leaf spring element can be provided for the purpose of being supported in the installed state, for example, by its second end section that is lying opposite the first end section on the frame or the body of the vehicle. With regard to the alignment of the leaf spring element, the leaf spring element extends either between the two opposite-lying suspension sides or in a transverse manner with respect thereto in the longitudinal direction of the vehicle.

The leaf spring element may comprise a middle section that extends between the end-side end sections of the leaf spring element. In the case of the middle section, this could be a very short section in comparison to one of the end sections or to the two end sections. The middle section may be provided for the purpose of being supported on the frame or the body of the vehicle. The support may be reduced to a bearing supporting the middle section. Reference to the middle section being supported also means that it is fixed so as not to rotate. The support may also comprise a bearing of the middle section while simultaneously hampering its ability to rotate. The end-sections of the leaf spring element that are arranged at a respective end of the middle section may be coupled to a respective suspension side of the running gear axle.

In accordance with another exemplary embodiment, the stabilizing means may also be embodied as a torsion bar stabilizer or may comprise at least one torsion bar stabilizer. The torsion bar stabilizer may comprise a middle section or may have end sections that are arranged at a respective end of the middle section. At least one of the end sections is bent with respect to the middle section that is between the end sections, and both end sections may be bent with respect to the middle section. The end sections may face in the same direction to form an U-shaped embodiment of the torsion bar stabilizer. As already mentioned in connection with the embodiment as a leaf spring element, the middle section of the torsion bar stabilizer may be supported on the frame or the body of the vehicle. The end sections could be embodied for the purpose of being coupled to a respective suspension side of the running gear axle.

In this manner, the torsion bar stabilizer may be twisted on itself in its middle section, such that, when the two suspension sides are moving in opposite directions, a reaction force is produced that is directed against the tilting moment. This does not occur when the two suspension sides are moving in the same direction since the torsion bar stabilizer cannot experience any torsion.

The stabilizing arrangement provided in accordance with the present disclosure makes possible the cost-effective body and an easier handling of the vehicle. Even in the case of a passive tilting running gear, the drive stability and the drivability of the is considerably increased at low velocities. For an active tilting running gear, the requirements for the output of the at least one actuator are reduced when using the stabilizing arrangement in accordance with the present teachings, so that the actuator can be smaller overall. As a consequence, the weight, cost, energy requirement, and required installation space are reduced accordingly.

The stabilizing arrangement also makes it possible for the vehicle or its body to be restored in an simple manner to its vertical position with regard to its running gear when stationary or parked. The force of the stabilizing means that counteracts the tilting moment can be selected to be of such a magnitude that the force eliminates the respective tilting moment or reduces it only in part. Due to a reduction in the tilting moment, it is possible for the stabilizing means to make it easier to handle the tilting vehicle.

In the direct comparison with a bicycle, the bicycle's mass is correspondingly less in comparison to the mass of the person sitting thereon. For this reason, it is easy to stabilize a bicycle by slightly shifting the mass center of gravity of the person riding the bicycle. In contrast, the mass of a tilting vehicle is considerably greater, so that it is far from easy to stabilize a tilting vehicle by shifting the weight of the person(s) operating the vehicle. This is the case when driving slowly, as automatic stabilizing of the (passive) tilting vehicle does not occur. The solution, in accordance with the present teachings, intervenes at this point, providing a force to counteract the respective tilting moment, the force arising at least from the respective tilt of the vehicle or its body.

Furthermore, the present disclosure relates to a tilting running gear for a non-rail-borne vehicle that can comprise at least three wheels. The tilting running gear, in accordance with the present disclosure, comprises a stabilizing device as described above. The exemplary embodiments previously described apply accordingly for the tilting running gear in accordance with the present teachings.

The tilting running gear comprises at least one multi-track running gear axle that has two opposed suspension sides. In addition, a balance beam is coupled at each end to a respective one of the suspension sides of the running gear axle. The balance beam also is connected to at least one passive stabilizing means. The stabilizing means is supported, in its installed state, with respect to a frame or a body of the vehicle. The stabilizing means is configured to provide a reaction force that counteracts a tilting moment that results from a tilt of the vehicle.

In accordance with the present disclosure, a pivot bearing is provided that lies between the free ends of the balance beam. The pivot bearing is connected, in the installed state, to the frame or the body of the vehicle in such a manner that the balance beam can rotate or pivot at least to a limited extent, about a stationary axis of rotation of the pivot bearing that extends in the longitudinal direction of the vehicle.

In one exemplary embodiment, the stabilizing means is one or more torsion spring elements. The at least one torsion spring element is arranged in the region of the pivot bearing and can be supported with respect to the frame or body of the vehicle.

The resultant advantages for such a stabilizing means have already been previously described in connection with the stabilizing arrangement and apply accordingly for the tilting running. For this reason, reference is made at this point to the previous descriptions.

In one exemplary embodiment, the tilting running gear can comprise at least one actuator. The actuator can be connected to the running gear axle in such a manner that, as a result of its active length change, the actuator makes it possible for the vehicle to tilt in a transverse manner in its respective steering direction. The actuator can also actively restore the vehicle to its upright position from a transverse tilt as required. By virtue of the combination with at least one actuator of this type, this becomes an active tilting running gear.

Figure 7:
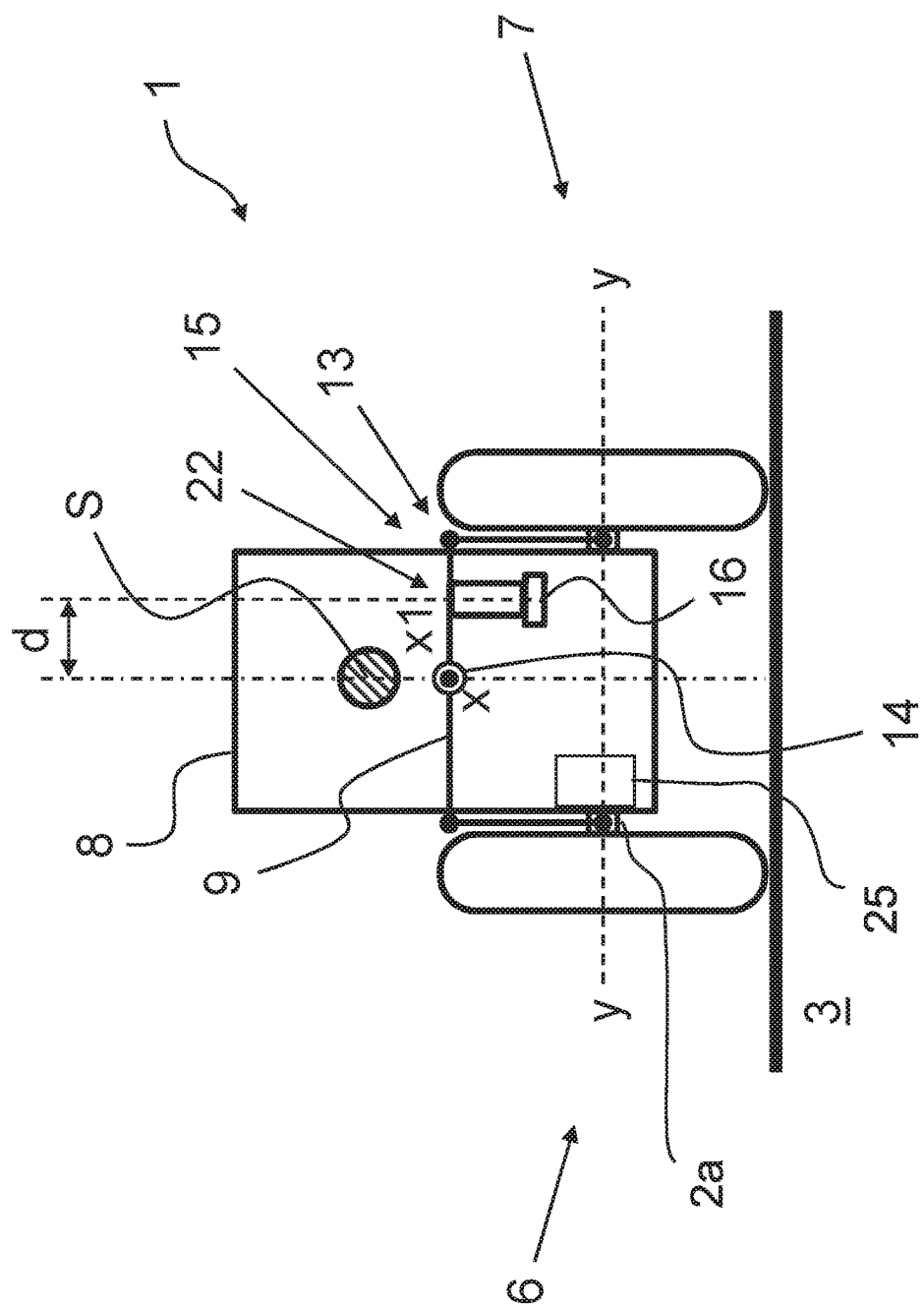
FIG. 7 is a front view of a vehicle that is restored to its upright position having a second exemplary embodiment of a tilting running gear in accordance with the present teachings.

With regard to the arrangement of the actuator, as illustrated in FIG. 7, in various exemplary embodiments, an actuator 25 can be connected to at least one of the two suspension sides of the running gear axle 2a. In the installed state, the actuator 25 can be supported with respect to the frame or the body 8 of the vehicle 1. The respective position of the actuator 25 may be selected so as to provide a favorable angle and/or a favorable moment arm. As a consequence, the actuator 25 can be selected to be small so that it is as light as possible and consumes as little power as possible.

Turning now to the drawings, FIG. 1 is a schematic representation of a non-rail-borne vehicle 1 having a typical passive tilting running gear 2. The direction of view in the front view illustrated in FIG. 1 is in a longitudinal direction x of the vehicle 1. A horizontal ground 3 is initially evident in this view and the vehicle 1 is standing on the ground with two wheels 4, 5 arranged on one common vehicle axle 2a, extending along an axis y, and a third wheel 4a, which is only shown in FIG. 1 for clarity purposes. In various additional embodiments, the vehicle 1 may have more than three wheels, in which case some of the wheels may not be visible in the front views illustrated in FIGS. 1-8. The two wheels 4, 5 are spaced apart from one another with respect to their respective standing plane on the ground 3 in a spacing T along the direction of the vehicle axis y. Each of the wheels 4, 5 is a component part of a suspension side 6, 7 of the multi-track vehicle axle 2a.

A body 8 of the vehicle 1 is between the left-hand wheel 4 and the right-hand wheel 5. The person who is generally controlling the vehicle 1 is located in or on the body, and is not further illustrated. A center of gravity S is indicated in the middle of the body 8. This center of gravity S can be the center of gravity of the vehicle 1 alone or it can be the center of gravity S of the vehicle 1 in combination with the person operating the vehicle. The center of gravity S is located at a constant height h above the ground 3.

Figure 2:
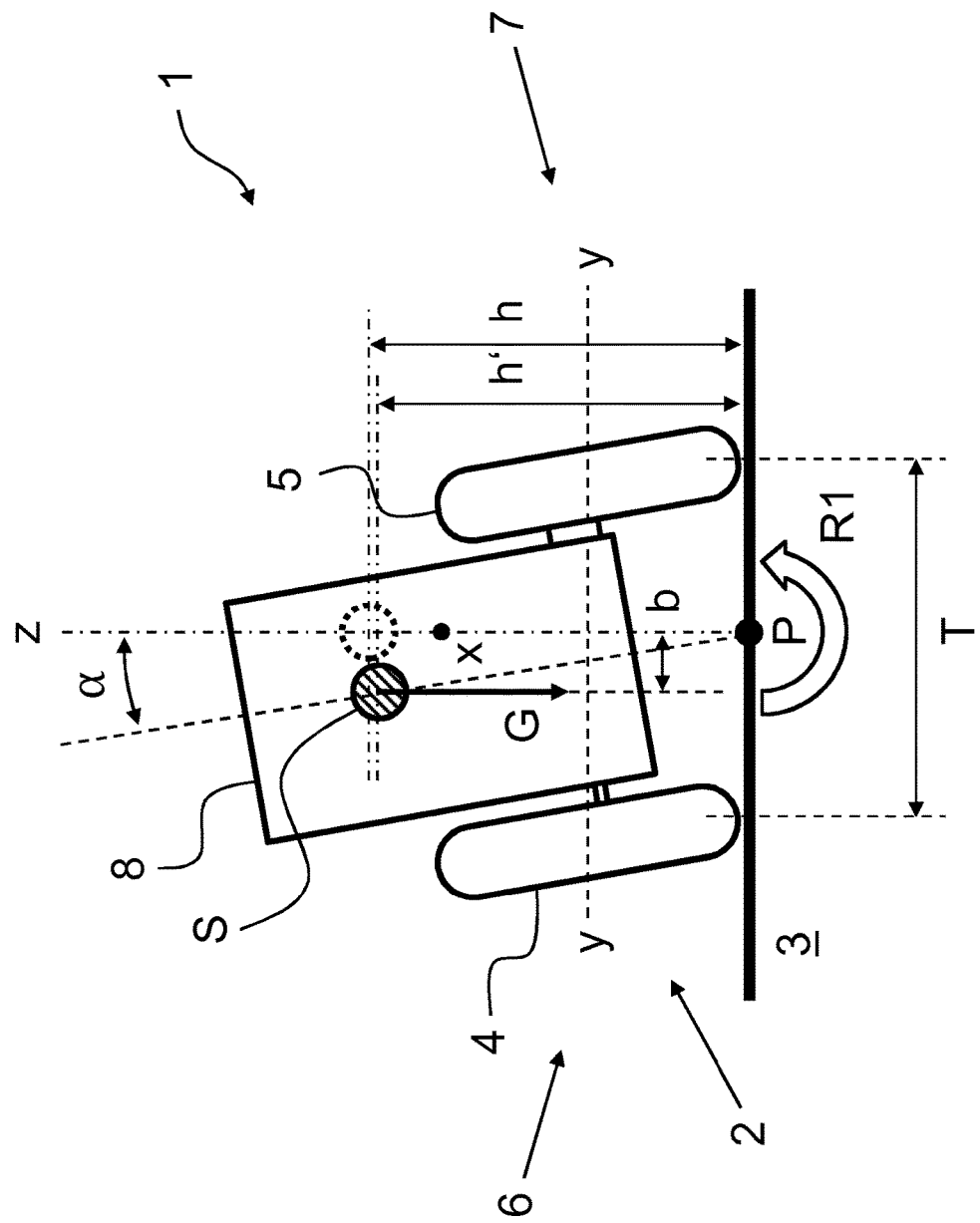
FIG. 2 is a front view of the tilting vehicle shown in FIG. 1 in the tilted position.

FIG. 2 illustrates a tilted state of the vehicle 1, the body 8 of which is tipped in this case to the left. As shown, the tilt of the body 8 produces an angle α with respect to a vertical axis z that extends in this case in a perpendicular manner with respect to the extension of the ground 3. As a consequence, the center of gravity S distances itself from the plane of the vertical axis z by forming a moment arm b. The center of gravity S simultaneously drops on a circular path to a variable height h' above the ground, the variable height h' being less than the contact height h in the upright position of the vehicle 1. The variable height h' depends upon the embodiment of the tilting running gear 2. Assuming that a pivot point P for the tilt of the vehicle 1 lies on the plane of the ground 3, the following equation is produced for the variable height h':

$$h' = h^* \cos \alpha$$

By virtue of the moment arm b of the center of gravity S increasing as the angle α increases, a tilting moment R1 that results from the tilt increases. The tilting moment R1 is calculated as follows:

$$R1 = m^* g^* h^* \sin \alpha = G^* h^* \sin \alpha$$

The weight force "G" of the center of gravity S arises recognizably from "m*g," wherein "m" corresponds to the mass and "g" corresponds to the normal gravitational acceleration (fall rate) in dependence upon the respective location. This can be assumed to be at the most 9.80665 m/s² or approx. 9.81 m/s².

Since the values for the normal gravitational acceleration "g," the mass "m," and the constant height "h" are constant, these values can be combined to form a single constant "k1." Expressed as a formula the tilting moment R1 is calculated as:

$$R1 = k1^* \sin \alpha$$

Figure 3:
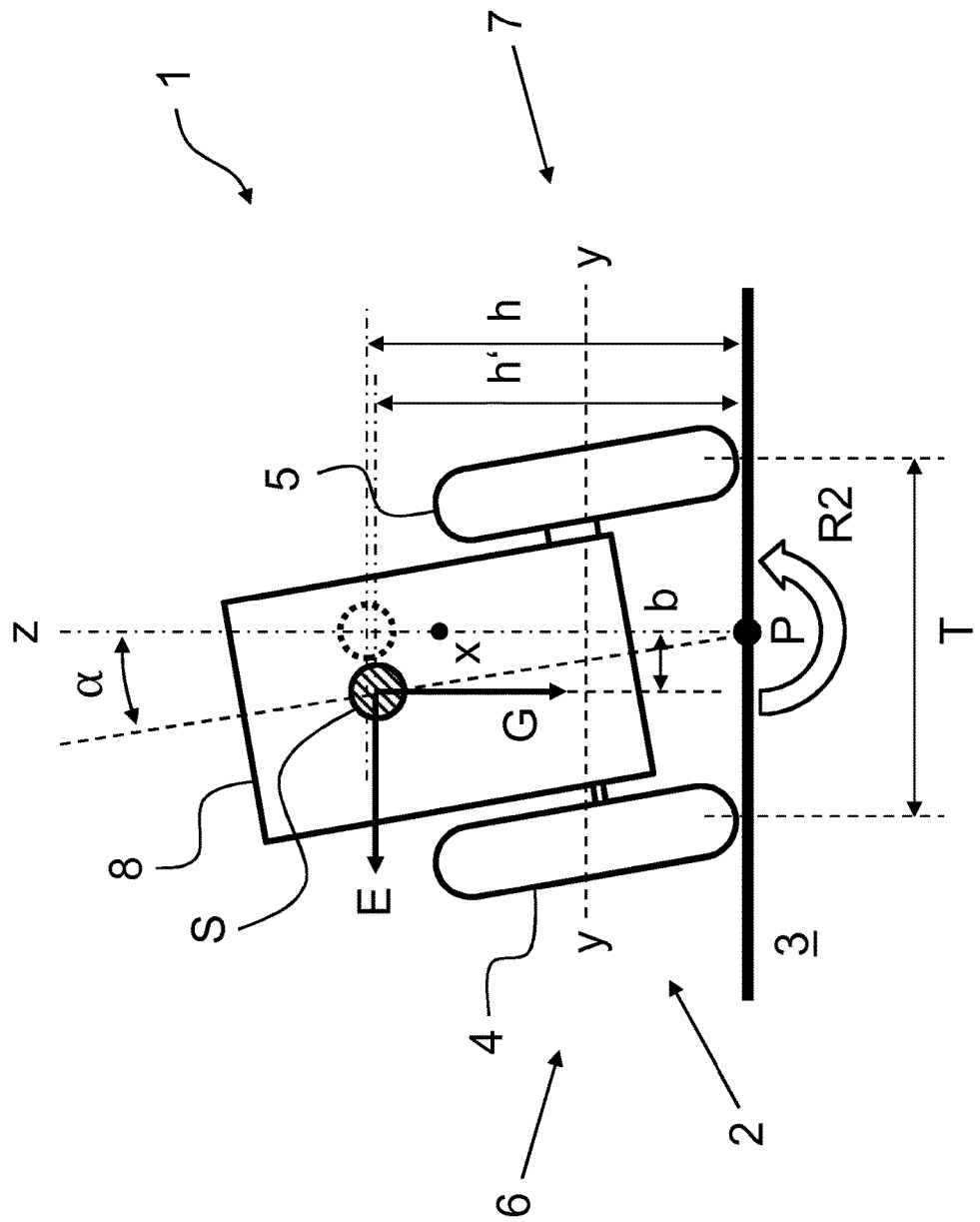
FIG. 3 is a front view of the tilting vehicle shown in FIG. 2 with additional details.

FIG. 3 illustrates a transverse force E that increases the tilting moment R1 and that is composed as follows:

$$E = m^* a$$

In this case, "a" does not represent the sideward acceleration required for the equilibrium in the stationary state of the vehicle 1 but rather it represents a temporary acceleration into the wrong direction (vehicle 1 is leaning in the wrong direction).

The resultant tilting moment R2 consequently arises from the total of the tilting moment R1 and the transverse force E with its moment arm in the form of the variable height h'. It follows from this that:

$$R2 = m^* g^* h^* \sin \alpha + m^* a^* h'$$

Figure 4:
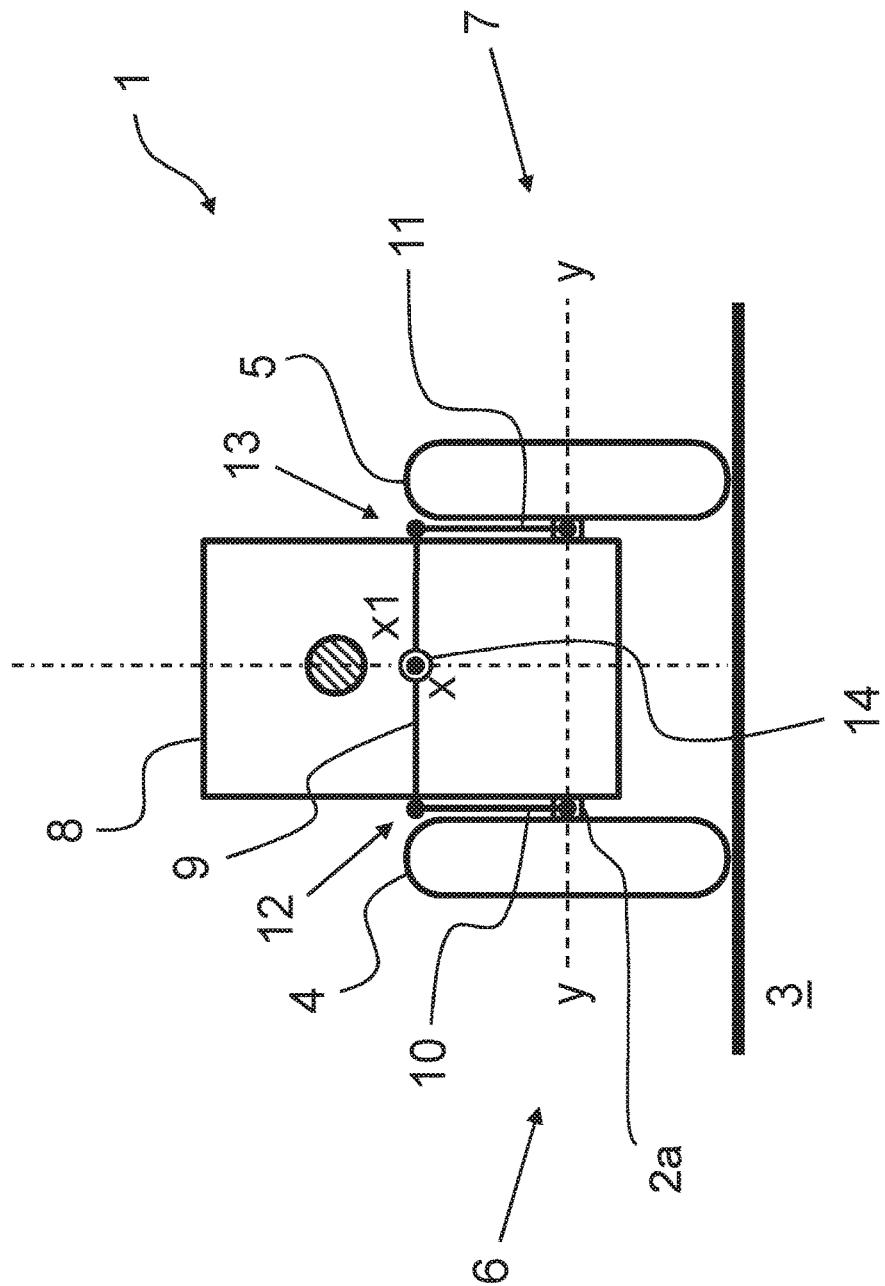
FIG. 4 is a front view of the tilting vehicle shown in FIG. 1 restored to its upright position and having a component of a typical tilting running gear.

FIG. 4 illustrates the vehicle 1 shown in FIG. 1 in the upright position. The tilting running gear 2 of the vehicle 1 is evident, the tilting running gear being supplemented by a typical balance beam 9 that is connected in an articulated manner by way of coupling elements 10, 11 to the wheels 4, 5 or to their respective suspension side 6, 7 of the running gear axle 2a. The balance beam 9 comprises two free ends 12, 13 that are remote from one another with a pivot bearing 14 arranged between the free ends 12, 13. The pivot bearing 14 is connected to the body 8 of the vehicle 1 such that the balance beam 9 can rotate about a stationary axis of rotation x1 of the pivot bearing 14 that extends in the longitudinal direction x of the vehicle 1. The longitudinal direction x and the axis of rotation x1 coincide with one another in this figure but this is to be regarded only as an example and it is within the scope of the present teachings that a spacing between the longitudinal direction x and the axis of rotation x1 may exist.

Figure 5:
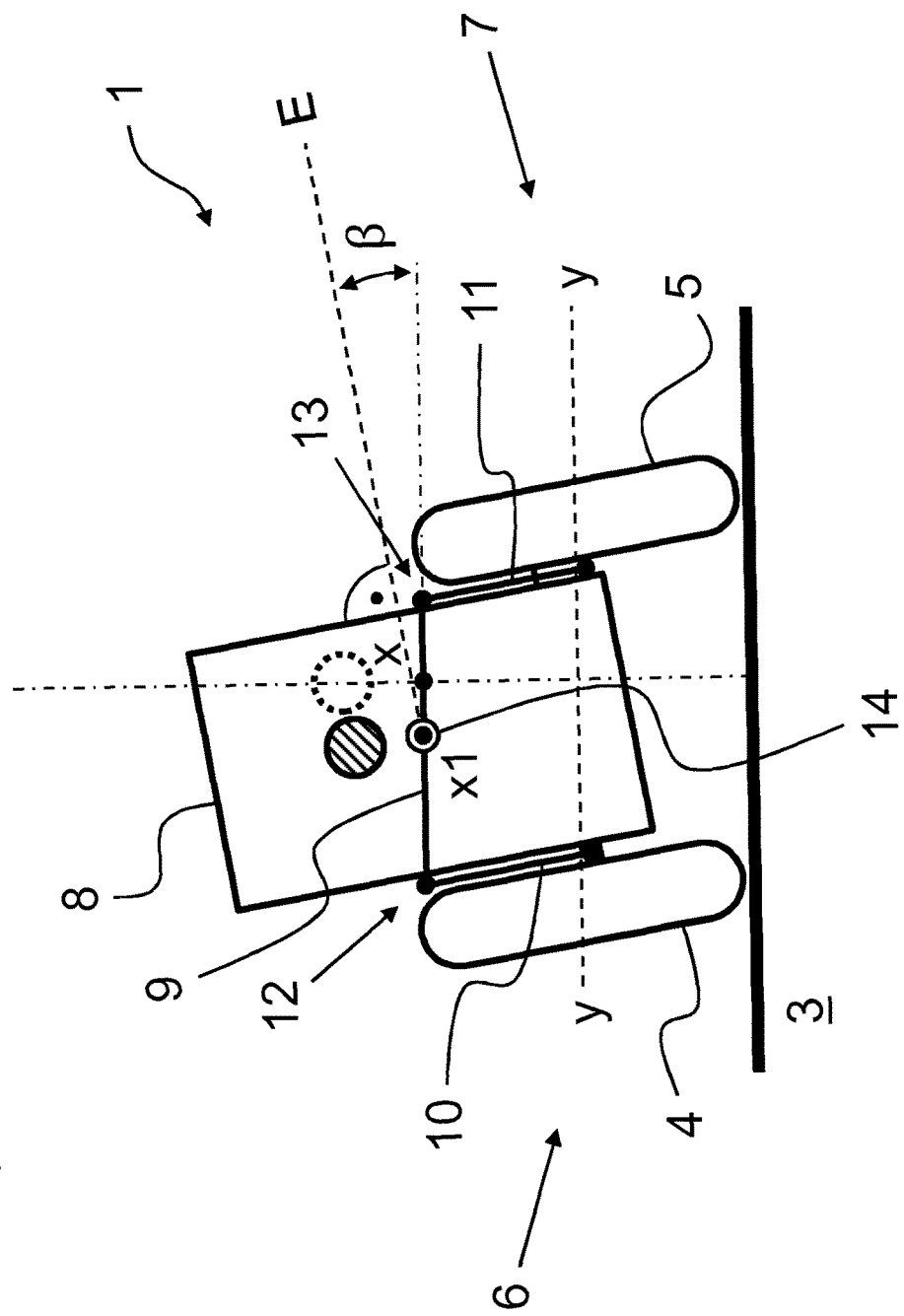
FIG. 5 is a front view of the tilting vehicle shown in FIG. 4 with detailed component of its tilting running gear in a tilted position.

FIG. 5 illustrates the tilted state of the vehicle 1 that is equipped with the balance beam 9 as shown in FIG. 4. As shown, when the vehicle 1 is negotiating a curve, the balance beam 9 causes the vehicle automatically to tilt, wherein simultaneously an opposing movement of the two suspension sides 6, 7 is produced with respect to their respective spring paths. As the tilt of the vehicle 1 or its body 8 increases, the angle β between a horizontal H of the body 8 and the extension of the balance beam 9 changes.

Figure 6:
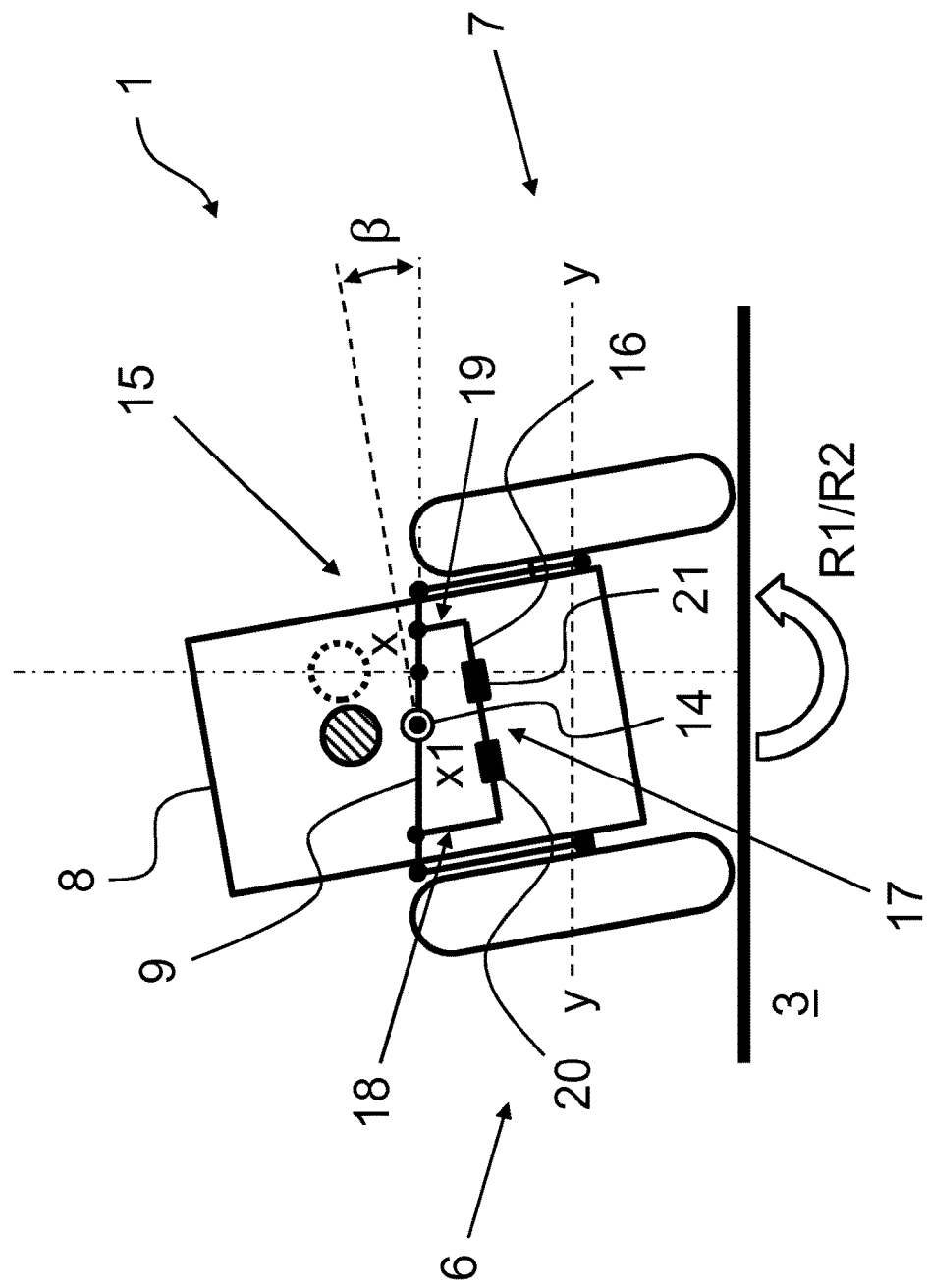
FIG. 6 is a front view of the tilted tilting vehicle shown in FIG. 5 in combination with a first exemplary embodiment of a tilting running gear in accordance with the present teachings.

FIG. 6 illustrates the embodiment of the vehicle 1 with a stabilizing arrangement 15 in accordance with the present teachings. In addition to the balance beam 9, the stabilizing arrangement 15 in accordance with the present teachings comprises a passive stabilizing means 16. The stabilizing means 16 is supported with the balance beam 9 and on the body 8 of the vehicle 1.

Figure 8:
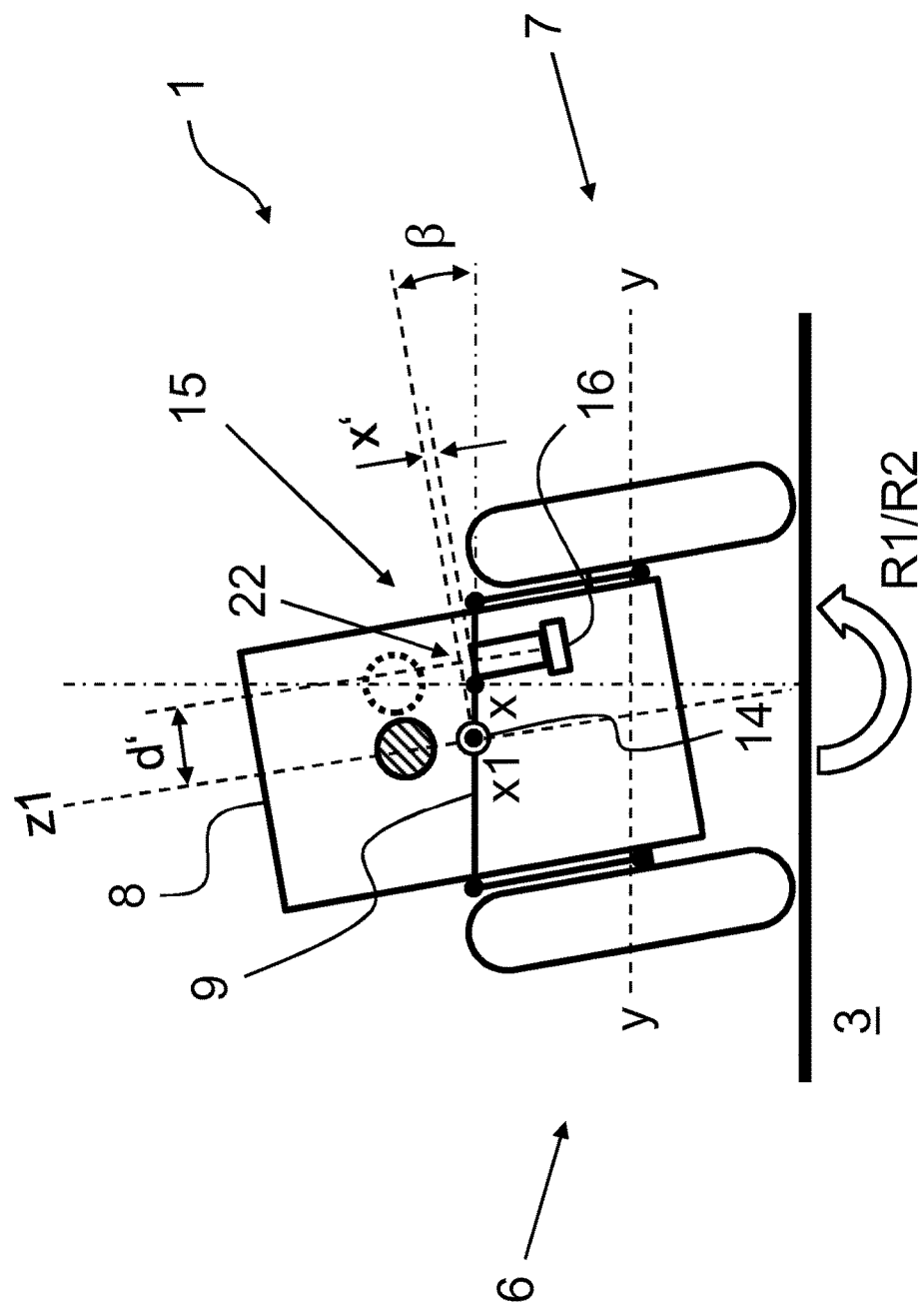
FIG. 8 is a front view of the tilted tilting vehicle shown in FIG. 7 with an exemplary embodiment of the tilting running gear in accordance with the present teachings.

The illustration of the stabilizing means 16 in FIGS. 6, 7 and 8 is to be regarded as merely symbolic for a number of possible embodiment forms for the stabilizing means 16. In addition to the embodiment in accordance with the present teachings as a torsion spring, the stabilizing means 16 illustrated in FIG. 6 can also be representative for an embodiment as a linear spring element, a leaf spring element and/or a torsion bar stabilizer.

In this case, the stabilizing means 16 in FIG. 6 is a torsion bar stabilizer that comprises a middle section 17 having end sections 18, 19 that are arranged at the end of the torsion bar stabilizer and are bent in the same direction relative to the middle section 17. In particular, the middle section 17 extends between the two suspension sides 6, 7. The stabilizing means 16 that is embodied as a torsion bar stabilizer is supported by way of its middle section 17 on the body 8 of the vehicle 1, in that the middle section 17 is connected in an articulated manner to the body 8 by means of suitable bearings 20, 21. As is evident, the middle section 17 bends at least in sections as a result of the tilt of the vehicle 1 so that the end sections 18, 19 of the middle section that are otherwise aligned in parallel are deflected in an elastic manner in opposing directions.

The two bent end sections 18, 19 of the stabilizing means 16 are connected in an articulated manner at the end to a respective side of the balance beam 9 so that the stabilizing means 16 is coupled to a respective suspension side 6, 7 of the running gear axle 2a. In this manner, the stabilizing means 16 is used for the purpose of providing a reaction force that counteracts the tilting moment R1 or R2 and results from the tilt of the vehicle 1 or its body 8. In the case of a tilt of the vehicle 1, the stabilizing means 16 is twisted in an elastic manner against its resistance which results in the torsion bar stabilizer attempting to assume the original arrangement. Accordingly, the restoring force of the bent middle section 17 provides the desired reaction force that reduces, at least in part, the tilting moment R1 or R2.

FIG. 7 illustrates the vehicle 1 that has been restored to the upright position and comprises a previously described variant of the stabilizing means 16 of the stabilizing arrangement 15 in accordance with the present disclosure, the stabilizing means being embodied as a linear spring element. This illustration is also to be understood in a symbolic manner for the embodiment in accordance with the present disclosure as a torsion spring element. The illustrated stabilizing means 16 is supported at one of its ends on the body 8, and its opposite end is connected in an articulated manner to a fastening region 22 of the balance beam 9. In the embodiment as the torsion spring element, this can be connected in an articulated manner to both sides of the balance beam 9. The fastening region 22 lies in this case between the right-hand free end 13 of the balance beam 9 and its pivot bearing 14. As a result of this arrangement, a moment arm d is produced for the stabilizing means 16 with respect to the center of gravity S that in this case lies in the vertical axis z.

FIG. 8 illustrates the vehicle 1 shown in FIG. 7 in the tilted state. As is evident, the fastening region 22 is lower as a result of the tilt, so that a difference of spacing x' with respect to the axis of rotation x1 of the pivot bearing 14 is provided in a vertical manner with respect to a vertical axis z1 of the body 8 that is tilted by the angle α. Simultaneously, as a result of the vehicle tilting by the angle α, the moment arm d becomes a moment arm d' that extends in a perpendicular manner with respect to a tilted vertical axis z1.

Further variants not illustrated in detail for the stabilizing means 16 of the stabilizing arrangement in accordance with the present disclosure 15 are feasible, in which the stabilizing means 16 can be embodied, for example, as a torsion spring element or a leaf spring element.

When the stabilizing means 16 is embodied as a torsion spring element, the opposing moment "M" of the stabilizing means to be generated as a reaction force can be calculated as follows:

$$M=k2*\beta$$

The use of a torsion spring element leads to a proportional different compensation about the angle α of tilt that can be desired depending upon the particular application.

The force that is to be provided by means of a leaf spring element or linear spring element can be calculated on the basis of the moment arm "d" as an opposing moment "M" that is to be provided, and in fact the calculation can be as follows:

$$M=c*x'*d'$$

where x' corresponds to the value from "d*sin β" and d' corresponds to the value from "d*cos β". The variable "c" represents the individual spring constants of the spring element being used.

This produces for the Moment "M":

$$M=c*d^2*\sin\beta*\cos\beta$$

If the values that do not change for "c" and "$d^2$" are combined into a common constant "k2", then the following is produced:

$$M=k2*\sin\beta*\cos\beta$$

This description and the accompanying drawing that illustrates exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. It is to be understood that the particular examples and embodiments set forth herein are non-limiting, and modifications to structure, dimensions, materials, and methodologies may be made without departing from the scope of the present teachings. Other embodiments of the disclosure will be apparent to those skilled in the art from consideration of the specification and practice of the disclosure disclosed herein. It is intended that the specification and embodiment described herein be considered as exemplary only.

What is claimed is:

1. A stabilizing arrangement for a tilting running gear of a non-rail-borne vehicle, the vehicle comprising two wheels arranged along one common multi-track running gear axle of the tilting running gear, the stabilizing arrangement comprising:
   a balance beam configured to have each end coupled to a respective suspension side of the multi-track running gear axle;
   a pivot bearing connected to a frame or body of the vehicle and rotatably supporting the balance beam such that the balance beam is rotatable about a stationary axis of rotation of the pivot bearing; and
   at least one stabilizing element connected to the balance beam and supported with respect to the frame or body of the vehicle, wherein the at least one stabilizing element is configured to provide a reaction force to counteract a tilting moment of the vehicle.

2. The stabilizing arrangement of claim 1, wherein the at least one stabilizing element comprises at least one of a torsion spring element, a linear spring element, a leaf spring element, and a torsion bar stabilizer.

3. The stabilizing arrangement of claim 2, wherein the at least one stabilizing element comprises two stabilizing elements.

4. The stabilizing arrangement of claim 1, wherein the at least one stabilizing element comprises a single stabilizing element.

5. A non-rail-borne vehicle, comprising:
   at least three wheels;
   a tilting running gear comprising one multi-track running gear axle that is common to two of the at least three wheels, the multi-track running gear axle having two opposed suspension sides;
   a balance beam having each end coupled to a respective suspension side of the multi-track running gear axle;
   a pivot bearing connected to a frame or body of the vehicle and rotatably supporting the balance beam such that the balance beam is rotatable about a stationary axis of rotation of the pivot bearing; and
   at least one stabilizing element connected to the balance beam and supported with respect to the frame or body of the vehicle, wherein the at least one stabilizing element is configured to provide a reaction force to counteract a tilting moment of the vehicle.

6. The vehicle of claim 5, further comprising at least one actuator, wherein the actuator is connected to the multi-track running gear axle such that a change in an active length of the actuator permits a transverse tilt of the vehicle in a steering direction or actively restores the vehicle to an upright position from a transverse tilt.

7. The vehicle of claim 6, wherein the actuator is connected to a suspension side of the multi-track running gear axle and the actuator is supported with respect to the frame or body of the vehicle.

8. The vehicle of claim 5, wherein the at least one stabilizing element comprises at least one of a torsion spring element, a linear spring element, a leaf spring element, and a torsion bar stabilizer.

9. The vehicle of claim 8, wherein the at least one stabilizing element comprises two stabilizing elements.

10. The vehicle of claim 5, wherein the at least one stabilizing element comprises a single stabilizing element.

11. A method for stabilizing a tilting running gear of a non-rail-borne vehicle, the vehicle comprising two wheels arranged along one common multi-track running gear axle of the tilting running gear, the method comprising:
   rotating a balance beam about a stationary axis of rotation with respect to a frame or body of the vehicle, the balance beam being coupled at each end to a respective suspension side of the multi-track running gear axle; and
   counteracting a tilting moment of the vehicle via at least one stabilizing element connected to the balance beam and supported with respect to the frame or body of the vehicle.

12. The method of claim 11, wherein rotating the balance beam about the stationary axis of rotation with respect to the frame or body of the vehicle comprises rotating the balance beam about a pivot bearing connected to the frame or body of the vehicle.

13. The method of claim 11, wherein counteracting the tilting moment of the vehicle via the at least one stabilizing element comprises providing a reaction force via at least one of a torsion spring element, a linear spring element, a leaf spring element, and a torsion bar stabilizer.

14. The method of claim 11, further comprising changing an active length of an actuator connected to the multi-track running gear axle to permit a transverse tilt of the vehicle in a steering direction or to actively restore the vehicle to an upright position from a transverse tilt.

* * * * *